United States Patent [19]
Lloyd

[11] Patent Number: 5,024,073
[45] Date of Patent: Jun. 18, 1991

[54] BEZEL LOCK, KEY AND RECEIVER ASSEMBLY

[75] Inventor: Russell M. Lloyd, York, Pa.

[73] Assignee: Rusken Machine & Tool Service, York, Pa.

[21] Appl. No.: 465,315

[22] Filed: Jan. 16, 1990

[51] Int. Cl.⁵ .............................................. E05B 27/00
[52] U.S. Cl. ....................................... 70/491; 70/208; 70/34
[58] Field of Search .................. 70/491, 403, 404, 34, 70/208

[56] References Cited

U.S. PATENT DOCUMENTS

| | | | |
|---|---|---|---|
| 1,499,444 | 7/1924 | Caillois | 70/403 |
| 1,923,025 | 8/1933 | Morse et al. | 70/34 |
| 3,089,329 | 5/1963 | Kerr | 70/208 X |
| 3,102,412 | 9/1963 | Christopher | 70/491 |
| 3,234,765 | 2/1966 | Kerr | 70/208 |
| 3,408,840 | 11/1968 | Hasenbein | 70/404 X |
| 3,420,077 | 1/1969 | Drazin | 70/491 X |
| 3,509,748 | 5/1970 | Trainor | 70/491 |
| 3,524,335 | 8/1970 | George | 70/491 |
| 3,661,001 | 5/1972 | Glass | 70/491 X |
| 3,961,507 | 6/1976 | Falk | 70/491 |
| 4,112,820 | 9/1978 | Conger et al. | 70/491 |
| 4,191,036 | 3/1980 | Steinbach | 70/491 |
| 4,835,998 | 6/1989 | Steinbach | 70/208 |

FOREIGN PATENT DOCUMENTS

| | | | |
|---|---|---|---|
| 381609 | 1/1908 | France | 70/491 |
| 414924 | 7/1947 | Italy | 70/491 |
| 531713 | 1/1941 | United Kingdom | 70/491 |

Primary Examiner—Robert L. Wolfe
Assistant Examiner—Suzanne L. Dino
Attorney, Agent, or Firm—Joseph Scafetta, Jr.

[57] ABSTRACT

A lock assembly includes a lock body having a hole longitudinally therethrough, a plunger arranged longitudinally in the hole, a single strong spring coiled around the plunger and arranged longitudinally in the hole inside the lock body for returning the plunger to an open position, a key for turning the plunger to a closed position, and a plate for receiving the plunger in the closed position. A hole in the head portion of the plunger and a hollowed end of the key have matching hexagonal cross-sections for engagement with each other. A first roll pin is seated in the hole in the head portion and guides the hollowed end of the key into the hole. A second roll pin is inserted crossways into another hole in a middle body portion of the plunger for retaining the plunger in the open position. Both the first and the second roll pins are hollow and springlike with a slit longitudinally through the side thereof in order to allow the pins to be squeezed into their respective holes and to be frictionally retained therein.

17 Claims, 4 Drawing Sheets

BEZEL LOCK, KEY AND RECEIVER ASSEMBLY

BACKGROUND OF THE INVENTION

1. Field of the Invention

The present invention relates to locks generally and, in particular, to a bezel lock, key and receiver assembly.

2. Description of the Related Art

A bezel-type lock has a rim that either holds an outer covering or is rotatable and has special markings. Bezel locks are usually simple to operate and are often designed for special uses, such as for gasoline pumps. The tight security offered by a bezel lock is an important consideration for gasoline pumps which can be dangerous if misused or vandalized.

Bezel-type and similar locks have several common elements, such as hollow keys, pins that are either solid rolls or cotter types, and a plurality of small thinly gauged wire springs. All three of these elements are present in the prior devices disclosed in U.S. Pat. No. 4,191,036 which issued to Steinbach on Mar. 4, 1980, U.S. Pat. No. 4,112,820 which issued to Conger et al. on Sept. 12, 1978, and U.S. Pat. No. 3,509,748 which issued to Trainor on May 5, 1970.

Although somewhat accepted in the gasoline pump trade, the prior art devices mentioned above all have distinct disadvantages because of the use of these three elements.

In particular, the hollow keys used in the prior art devices have complex shapes, such as the star-like design of Steinbach. Consequently, the machining costs for such hollow keys are very high, thus making the keys quite expensive.

In regard to the pins used in the prior art devices, the solid roll pins cannot give inwardly if the outer diameter of a pin is too closely dimensioned to the inner diameter of the bore into which the pin is intended to be inserted. On the other hand, cotter pins often fit loosely in their bores. However, they can be easily pushed out of these bores.

With respect to the plurality of small thinly gauged wire springs used in the prior art devices, less compression is obtained by small springs which wear out quickly, primarily because the thinly gauged wire used to manufacture them is too brittle to withstand heavy use.

Thus, it remains a problem in the lock manufacturing field to develop a tight security lock with a hollow key that can be easily and inexpensively machined with a pin that can give inwardly but still can be retained tightly in its bore, and with a spring that has good compressive strength and long wear life.

SUMMARY OF THE INVENTION

The present invention may be summarized as a bezel lock, key and receiver assembly that is reliable in use, relatively inexpensive to manufacture, and easy to install.

A primary object of the present invention is to provide a hollow key machined inexpensively with a simple hexagonal cross-section from a hex-shaped bar that is a standard stock item which can be drilled at one end in a one-step operation.

A secondary object of the present invention is to provide a spring roll pin which is hollow and slit down its cylindrical side so that the roll pin can give inwardly, if necessary, but still fit tightly in its bore and not be easily pushed out of such bore.

A tertiary object of the present invention is to provide a single, thick, heavily gauged metal spring which has great compressive strength and long wear life.

Another object of the present invention is to provide a receiver which has extra threading length provided by a threaded nut welded thereto, a bendable thinly gauged metal backing plate, a bore means for allowing a bolt to pass therethrough for attaching the receiver to a framework on the gasoline pump, and a leg that flares outwardly to act as a locator for placement of the receiver on the gasoline pump framework.

How these objects of the present invention are accomplished will become more readily understood from the following brief description of the drawings and the subsequent detailed description of the preferred embodiments.

DETAILED DESCRIPTION OF THE PREFERRED EMBODIMENT

Figures 1, 2:
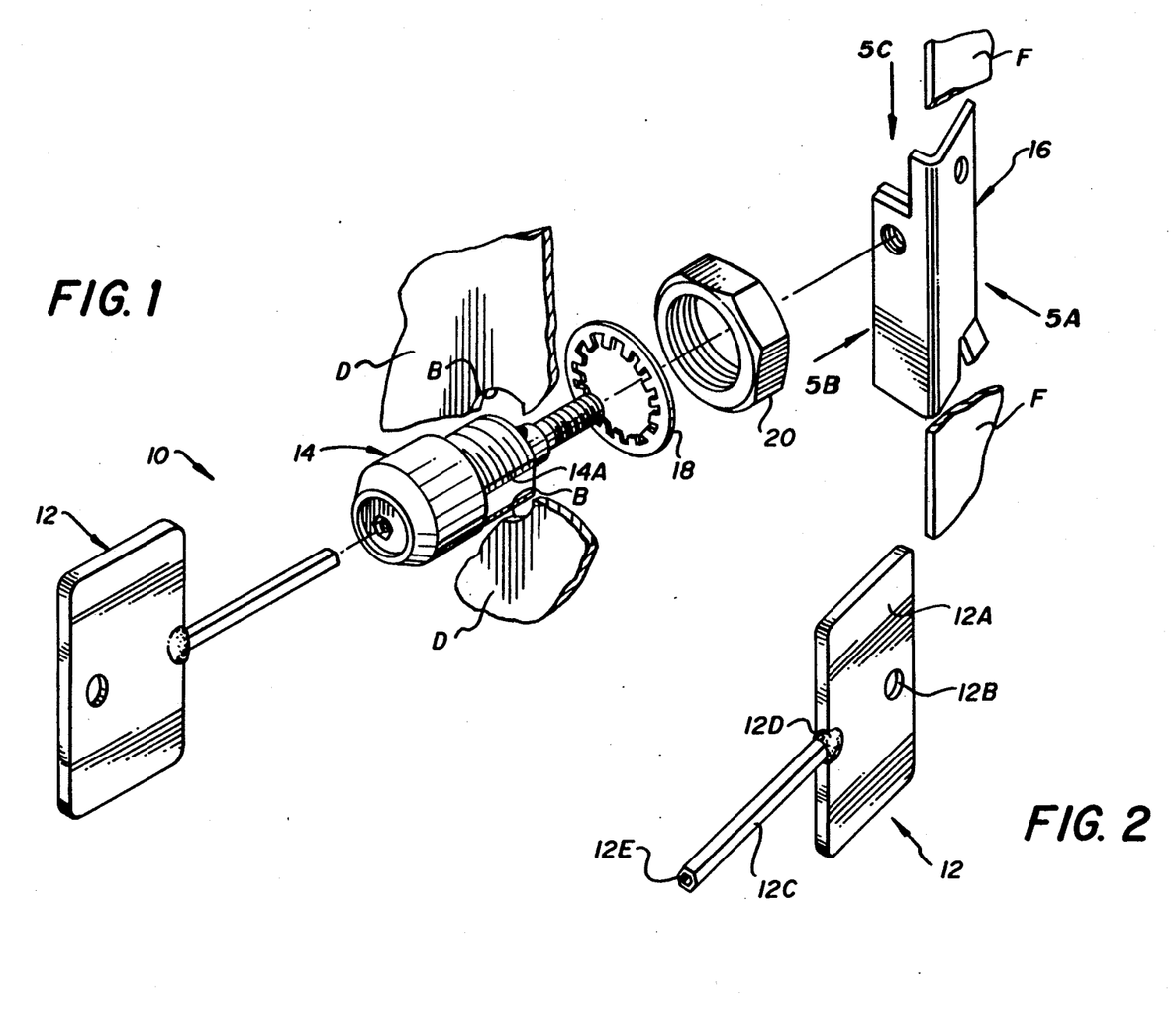
FIG. 1 is an exploded perspective view of the key, lock, and receiver assembly of the present invention.
FIG. 2. is a perspective view of the key of the present invention.

In FIG. 1, there is shown a bezel lock assembly 10 having a key 12, a lock body 14 mounted in a door D, and a receiver 16 mounted on a framework F of a gasoline pump (not shown). In order to install the lock body 14 in the door D, a bore B is first drilled through the door D so that the lock body 14 may be inserted into a front side of the door D. In order to secure the lock body 14 to the door D, an internally toothed lock washer 18 and a finely threaded jam nut 20 are screwed onto a rear threaded portion 14A of the lock body 14.

In FIG. 2, the key 12 is seen to have a flat handle 12A for allowing easy gripping and manipulating of the key 12. A bore 12B is made through the flat handle 12A so that the key 12 may be hung either on a hook or a chain by an operator of the gasoline pump. A stem 12C is attached to the flat handle 12A by a weld 12D at one end. Opposite thereto, the stem 12C has a hollowed end 12E that extends partially down the length of the stem 12C. Because the stem 12C is a common stock item having a hexagonal cross-section, the hollowed end 12E is machined to have a hexagonal cross-section also. Although the hexagonal cross-section is preferred, other shapes may also be selected. For example, an easier cross-section to machine would be either square or triangular. On the other hand, a more difficult cross-section to machine would be octagonal. After the stem 12C is attached to the flat handle 12A by the weld 12D, the entire key 12 is plated with cadmium and, thereafter, a clear chromate is added to make the key 12 resistant to corrosion.

Figures 3A, 3B, 3C, 4A, 4B, 4C, 4D, 5A, 5B, 5C:
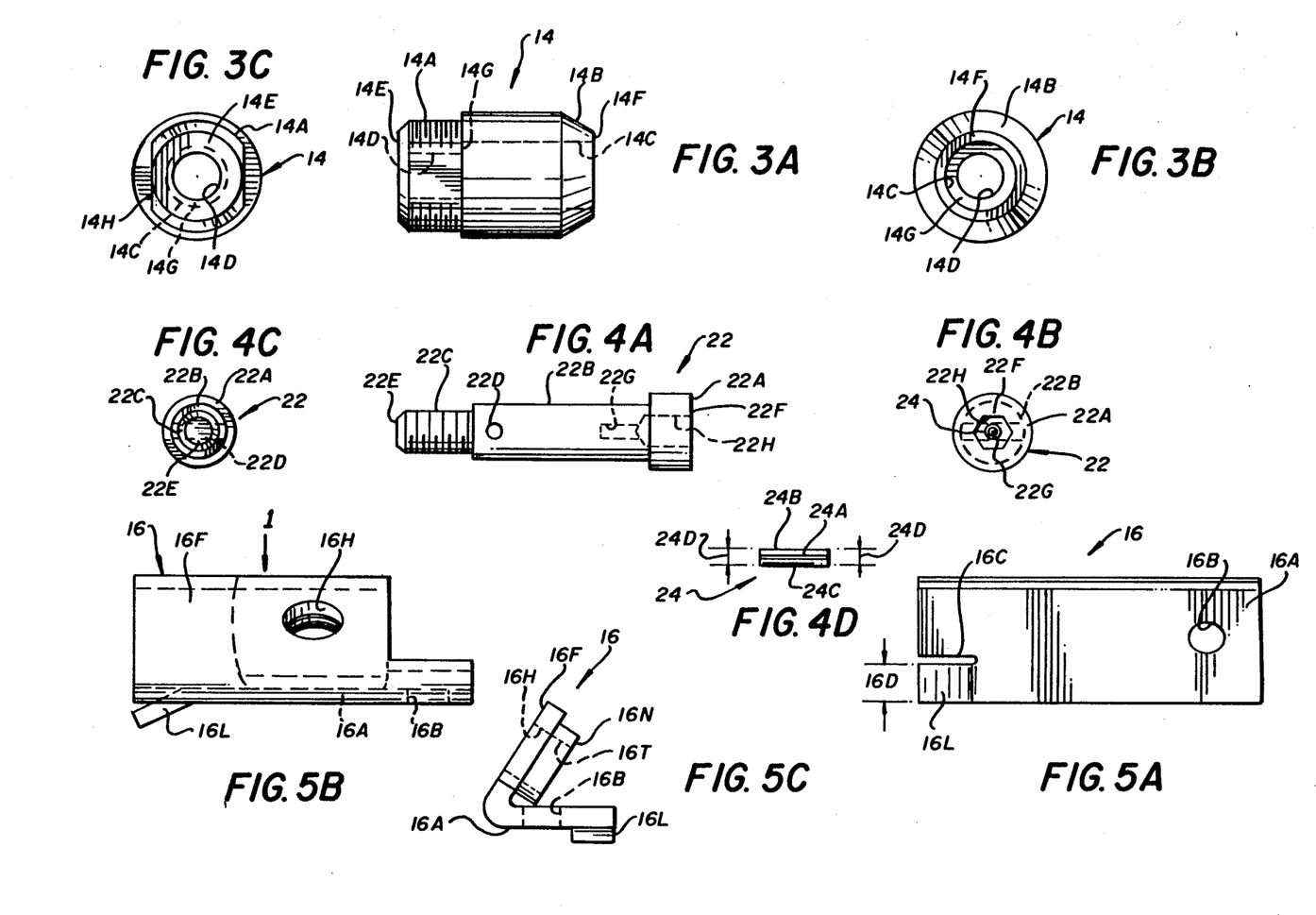
FIG. 3A is a side elevational view of the lock body of the present invention.
FIG. 3B is a front end view of the lock body of the present invention.
FIG. 3C is a rear end view of the lock body of the present invention.
FIG. 4A is a side elevational view of a plunger of the present invention.
FIG. 4B is a front end view of the plunger of the present invention.
FIG. 4C is a rear end view of the plunger of the present invention.
FIG. 4D is a side elevational view of the spring roll pin of the present invention.
FIG. 5A is a side elevational view of the receiver of the present invention, looking in the direction of arrow 5A in FIG. 1, with the receiver being turned 90° clockwise on its side.
FIG. 5B is a front end view of the receiver of the present invention, looking in the direction of arrow 5B in FIG. 1, with the receiver being turned 90° clockwise on its side.
FIG. 5C is a top plan view of the receiver of the present invention, looking in the direction of arrow 5C in FIG. 1.

In FIG. 3A, the lock body 14 is shown with its rear threaded portion 14A and a front body portion 14B. A long counterbore 14C is cut longitudinally from a front end 14F through the front body portion 14B. Similarly, a hole 14D is drilled longitudinally from a rear end 14E through the rear threaded portion 14A. The way that the counterbore 14C and the hole 14D are machined is as follows: first, the hole 14D of a selected small diameter is drilled longitudinally from the rear end 14E of the rear threaded portion 14A completely through the lock body 14; and second, the counterbore 14C of a selected larger diameter is sunk from the front end 14F of the front body portion 14B until the rear threaded portion 14A is reached so that an internal shoulder 14G is formed therein for a reason to be discussed later.

In FIG. 3B, there is shown, from the outside to the inside from the front of the lock body 14, the following parts in order of appearance: the front body portion 14B, the front end 14F, the counterbore 14C, the internal shoulder 14G, and the hole 14D drilled completely through the lock body 14.

In FIG. 3C, there is shown, from the outside to the inside from the rear of the lock body 14, the following parts in order of appearance: the rear threaded portion 14A, the rear end 14E, the counterbore 14C, flats 14H, the internal shoulder 14G, and the hole 14D drilled completely through the lock body 14. The so-called "flats" 14H are parallel flat surfaces which are milled on the rear threaded portion 14A to prevent the lock body 14 from turning after the lock body 14 is installed in the bore B of the door D.

In FIG. 4A, the plunger 22 is shown for insertion through the hole 14D of the lock body 14 seen in FIG. 3A immediately above FIG. 4A. The plunger 22 has a head portion 22A, a middle drilled crossways through the middle body portion 22B. The rear threaded portion 22C has a solid flat end 22E that is chamfered around its periphery. The head portion 22A of the plunger 22 has a front face 22F through which a down hole 22G of a selected small diameter is first drilled to a predetermined depth. Second, a hole 22H of a selected larger diameter with a hexagonal cross-section is cut through the front face 22F into the head 22A of the plunger 22.

In FIG. 4B, there is shown, from the outside to the inside from the front of the plunger 22, the following parts in order of appearance: the head portion 22A, the middle body portion 22B, the front face 22F, the hole 22H with the hexagonal cross-section, a spring roll pin 24 shown in FIG. 4D to be discussed below, and the down hole 22G into which the spring roll pin 24 is seated.

In FIG. 4C, there is shown, from the outside to the inside from the rear of the plunger 22, the following parts in order of appearance: the head portion 22A, the middle body portion 22B, the rear threaded portion 22C, and the solid flat end 22E. The hole 22D drilled crossways through the middle body portion 22B is seen in phantom lines.

In FIG. 4D, a hollow springlike roll pin 24 is shown with a slit 24D cut longitudinally therethrough. A first roll pin 24 is inserted into the down hole 22G of the plunger 22, shown in FIGS. 4A and 4B, and is centrally seated therein. This first roll pin 24 serves to guide the hollowed end 12E of the key 12 into the hole 22H in the head portion 22A of the plunger 22. Note that both the hollowed end 12E of the key 12 and the hole 22H in the head portion 22A of the plunger 22 have hexagonal cross-sections. A second roll pin 24 is inserted crossaways into the hole 22D drilled through the middle body portion 22B of the plunger 22 illustrated in FIG. 4A above FIG. 4D. This second roll pin 24 serves to retain the plunger 22 in the lock body 14 seen in FIG. 3A at the rear end thereof. The second roll pin 24 has an outer diameter 24D slightly larger than the diameter of the hole 22D drilled crossways through the middle body portion 22B. The outer diameter of the first roll pin 24 is also larger than the diameter of the down hole 22G of the plunger 22.

Nevertheless, because of the slit 24A made in the roll pin 24, an assembler can squeeze cylindrical sides 24B and 24C of the roll pin 24 together so that the outer diameter 24D of the roll pin 24 is momentarily reduced, thus making it possible to insert the second roll pin 24 into the crossways hole 22D and the first roll pin 24 into the down hole 22G of the plunger 22. When the assembler releases the sides 24B and 24C of the roll pin 24, the roll pin 24 springs back to its original outer diameter 24D so that tight frictional fits are made in the down hole 22G and the crossways hole 22D.

Unlike the solid roll pin of the prior art which cannot give inwardly, the springlike roll pin 24 of the present invention is hollow and slit down the cylindrical sides 24B and 24C to allow inward giving.

When machining is completed, the plunger 22 shown in FIGS. 4A, 4B, and 4C is plated with cadmium and then is finsihed with black chromate to resist corrosion.

In FIG. 5A, the receiver 16 is seen in the direction of an arrow 5A in FIG. 1. A side face 16A of the receiver 16 has a bore 16B drilled therethrough for the purpose of allowing either a hex-headed bolt or a screw to pass therethrough. Either the hex-head bolt or the screw (both not shown in FIG. 5A, but see FIG. 8) fasten the receiver 16 to the framework F seen in FIG. 1. The side face 16A also has notch 16C cut therein to form a leg 16L.

In FIG. 5B, the receiver 16 is seen in the direction of an arrow 5B in FIG. 1. An arrow 1 in FIG. 5B shows the orientation of the receiver 16 in FIG. 1.

In FIG. 5B, the receiver 16 is illustrated with the side face 16A and the bore 16B in phantom lines. The leg 16L is shown to flare outwardly so that it acts as a locator for the receiver 16 on the framework F. Essentially, the leg 16L sticks into a round positioning hole (not shown in FIG. 5B, but see FIG. 8) having a diameter which is slightly longer than the width 16D of the leg 16L, as seen in FIG. 5A.

In FIG. 5B, the receiver 16 is also shown to have a front face 16F with a hole 16H drilled therethrough for allowing the rear portion 22C of the plunger 22 seen in FIG. 4A to be threaded thereinto.

In FIG. 5C, the receiver 16 is seen in the direction of an arrow 5C in FIG. 1. Behind the front face 16F of the receiver 16, there is a nut 16N being welded thereto and having its internal threads 16T aligned with the threading (not shown) cut into the hole 16H. The purpose of the nut 16N is to provide extra threading length for engagement with the rear portion 22C of the plunger seen in FIG. 4A. Also, because the nut 16N is welded behind the front face 16F, the receiver 16 may be made from a metal plate that has a gauge thinner than the standard thicker gauged metal which is normally used for conventional backing plates. These conventional backing plates are usually so thick that it is very difficult, if not impossible, to bend small pieces thereof around the corners of the framework F seen in FIG. 1 for the standard gasoline pump. By using thinner gauged metal when manufacturing the receiver 16 and subsequently welding the nut 16N therebehind for the purpose of providing extra threading length, it is possible to bend the receiver 16 on a job site with a conventional vise so that the lock assembly 10 of the present invention may be retrofitted into the framework F of the standard gasoline pump.

Also, in FIG. 5C, there is shown in the receiver 16 the side face 16A, the bore 16B therethrough, and the leg 16L flaring outwardly to aid in locating the receiver 16 on the framework F seen in FIG. 1.

Figures 6A, 6B, 6C, 6D, 6E:
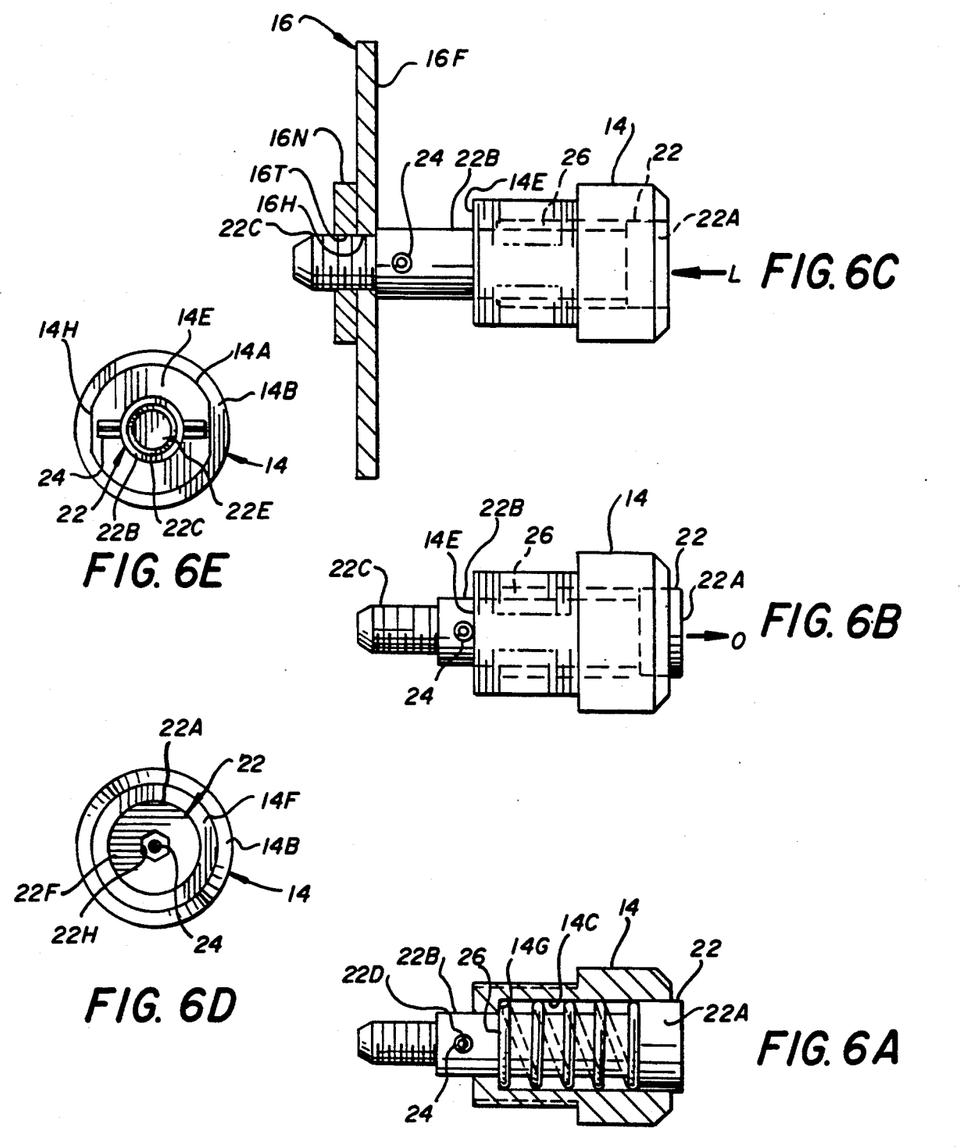
FIG. 6A is a cross-sectional view of the lock body, the plunger, and associated elements assembled together in an open or unlocked position.
FIG. 6B is a side elevational view of the lock body, the plunger, and the associated elements assembled together in the open position.
FIG. 6C is a side elevational view of the lock body, the plunger, and the associated elements assembled together in a closed or locked position.
FIG. 6D is a front end view of the lock body, the plunger, and the associated elements assembled together.
FIG. 6E is a rear end view of the lock body, the plunger, and the associated elements assembled together.

In FIG. 6A, there is seen the lock body 14, the plunger 22 inserted therein, the second roll pin 24 squeezed into the hole 22D drilled crossways through the middle body portion 22B of the plunger 22, and a single, thick, heavily gauged metal spring 26 coiled partially around the middle body portion 22B of the plunger 22 inside the counterbore 14C of the lock body 14. The spring 26 is confined to move longitudinally between the head portion 22A of the plunger 22 and the internal shoulder 14G of the lock body 14.

In FIG. 6B, there is shown the lock body 14, the head portion 22A of the plunger 22, the middle body portion 22B of the plunger 22, the second roll pin 24, and the threaded rear portion 22C of the plunger 22. Because the threaded rear portion 22C of the plunger 22 is not engaged with the hole 16H and the threading 16T of the nut 16N of the receiver 16 seen in FIG. 6C, the lock body 14, the plunger 22, and their associated elements shown in FIG. 6B are considered to be in an open or unlocked position. Whenever the threaded rear portion 22C is not engaged with the receiver 16 seen in FIG. 6C, the single strong spring 26 tries to decompress itself and pushes the head portion 22A of the plunger 22 in a rightward open direction indicated by an arrow O in FIG. 6B. The plunger 22 is pulled rightwardly back into the lock body 14, but is prevented from being forced out of the lock body 14 by the second roll pin 24 which abuts against the rear end 14E of the lock body 14 to limit any further rightward movement of the plunger 22.

In FIG. 6C, there is shown the lock body 14, the head portion 22A of the plunger 22 now recessed into the lock body 14, the spring 26 now compressed in the lock body 14, the middle body portion 22B of the plunger 22 now protruding farther from the rear end 14E of the lock body 14 than seen in the view of FIG. 6B, the roll pin 24, and the rear portion 22C of the plunger 22 threaded into the front face 16F of the receiver 16 and the nut 16N welded therebehind. The threading on the rear portion 22C of the plunger 22 engages the threading in the hole 16H in the front face 16F and the internal threads 16T of the nut 16N. The strength of the spring 26 forcing the plunger 22 in the rightward direction is overcome by the action of the operator turning the key 12 (not shown in FIG. 6C, but see FIG. 8) in the locking direction indicated by an arrow L in FIG. 6C, so that the rear portion 22C of the plunger 22 is threaded into the hole 16H of the receiver 16 and is engaged with the internal threads 16T of the nut 16N.

In FIG. 6D, there is shown, from the outside to the inside from the front of FIGS. 6A, 6B and 6C, the following parts in order of appearance: the lock body 14, the front body portion 14B of the lock body 14, the front end 14F of the lock body 14, the plunger 22, the head portion 22A of the plunger 22, the hole 22H with the hexagonal cross-section in the front face 22F of the head portion 22A, and the first spring roll pin 24. The hollowed end 12E of the key 12 shown in FIG. 2 engages around the first roll pin 24 seen in FIG. 6D, while an outer periphery of the hex-shaped stem 12C of the key 12 of FIG. 2 frictionally engages inside the hex-shaped hole 22H in the plunger 22 seen in FIG. 6D.

In FIG. 6E, there is shown, from the outside to the inside from the rear of FIGS. 6A and 6B, the following parts in order of appearance: the lock body 14, the front body portion 14B of the lock body 14, the threaded rear portion 14A of the lock body 14, the rear end 14E of the lock body 14, the flats 14H on the rear portion 14A, the second roll pin 24, the plunger 22, the middle body portion 22B of the plunger 22, the threaded rear portion 22C of the plunger 22, and the flat end 22E of the plunger 22.

Figure 7:
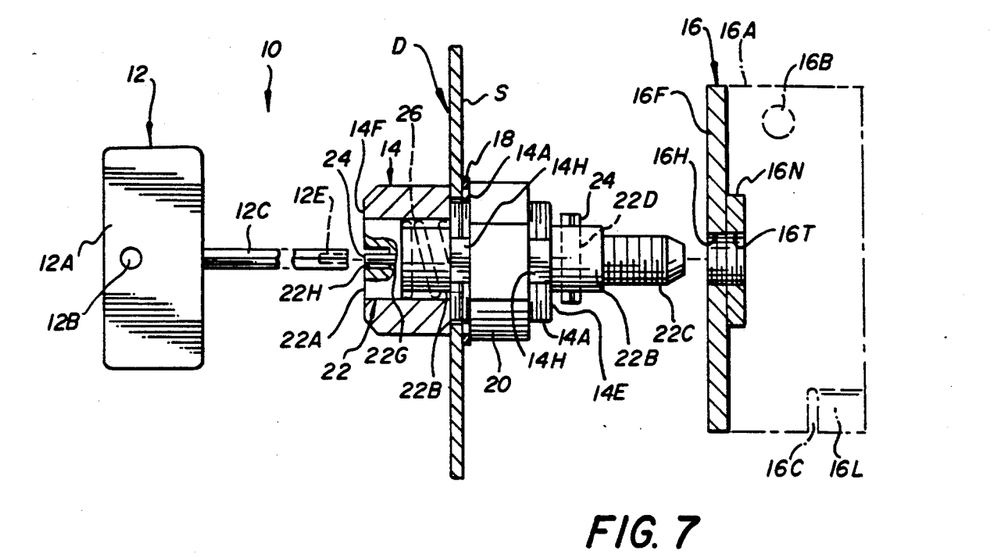
FIG. 7 is a cross-sectional view of the key, lock, and receiver assembly of the present invention.

In FIG. 7, the lock assembly 10 of the present invention is shown in cross-section to be mounted to the door D of the gasoline pump. From left to right, there is illustrated generally the key 12, the flat handle 12A with the bore 12B therethrough, the stem 12C with its hollowed hex-shaped end 12E partially extending thereinto, the lock body 14 with its front end 14F, the plunger 22 with its head portion 22A, the hex-shaped hole 22H with the first roll pin 24 seated in the down hole 22G, the spring 26 coiled around the middle body portion 22B of the plunger 22, the door D on the gasoline pump, the threaded rear portion 14A of the lock body 14, the flat surface 14H on the side of the rear portion 14A, the washer 18 threaded onto the rear portion 14A, the jam nut 20 screwed onto the same rear portion 14A for retaining the lock body 14 on the door D, the second roll pin 24 squeezed into the crossways hole 22D drilled through the middle body portion 22B of the plunger 22, the threaded rear portion 22C of the plunger 22, the receiver 16 with its front face 16F through which the hole 16H is drilled, the nut 16N with its internal threading 16T, the side face 16A with the bore 16B cut therethrough, and the leg 16L next to the notch 16C cut therein.

Figure 8:
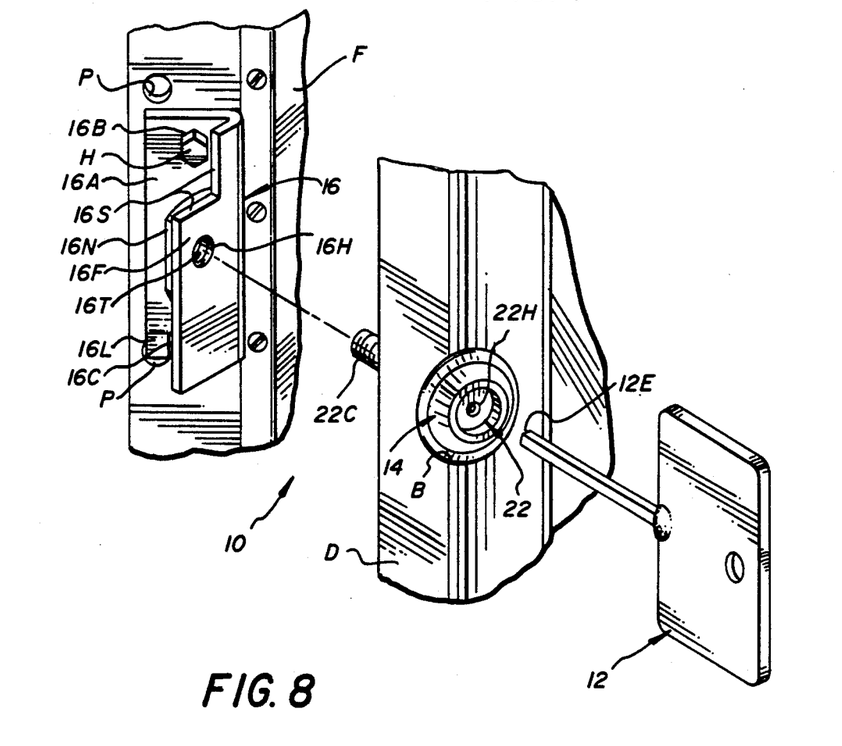
FIG. 8 is a perspective view of the key, lock, and receiver assembly of the present invention mounted on the framework of a gasoline pump.

In FIG. 8, the lock assembly 10 of the present invention is shown in a perspective view with the key 12 ready to be inserted into the plunger 22, with the lock body 14 mounted in the bore B drilled in the door D, with the threaded rear portion 22C of the plunger 22 ready to be inserted into the receiver 16, with the receiver 16 fastened to the framework F of the gasoline pump by a hex-headed bolt H, and with the leg 16L flared into one of a plurality of openings P for positioning the receiver 16 on the framework F of the gasoline pump. A section 16S is cut out of the front face 16F of the receiver 16 so that the hex-headed bolt H may be passed through the bore 16B in the side face 16A of the receiver 16.

In order to retrofit a gasoline pump in a station by replacing an existing lock assembly with the lock assembly 10 of the present invention, certain procedural steps must be taken. These steps can be best understood by referring to FIGS. 7 and 8 together.

The first retrofitting step is removal of a rain guard, if any, so that access may be made to the existing lock body and receiver. After the old lock body and receiver are extracted from the door D and the framework F, respectively, the installer must check the alignment of the door D with the framework F. If the door D is not properly aligned, then the screws (not shown) on the hinges (not shown) of the door D must be loosened so that the door D may be properly realigned. Then the screws are retightened. Next, the receiver 16 is loosely mounted to the framework F by passing the hex-headed bolt H through the cut-out section 16S into the bore 16B in the side face 16A of the receiver 16. After the receiver 16 is properly located on the framework F by putting the flaring leg 16L into a selected opening P in the framework F, the loosely mounted hex-shaped bolt H is tightened into a hole (not shown) aligned behind the bore 16B so that the bolt H may be secured to the framework F. Next, the lock body 14 is inserted into a front side of the bore B in the door D and is secured thereto by first screwing the washer 18 and then the jam nut 20 (see FIG. 7) onto the threaded rear portion 14A protruding from the lock body 14 through a back side S of the door D. The newly installed lock assembly 10 of the present invention is now ready to be used.

The use of the lock assembly 10 of the present invention will now be described again with reference to FIGS. 7 and 8 together. First, the door D is closed against the framework F to be sure that the fit will be watertight. With the door D in its closed position, the gasoline pump operator inserts the key 12 with its hollowed end 12E into the hole 22H in the plunger 22. As the key 12 is turned, the rear portion 22C of the plunger 22 is threaded into the hole 16H in the front face 16F of the receiver 16 and then is engaged with the threads 16T of the nut 16N welded behind the receiver 16. As the threading continues, the force of the spring 26 coiled around the plunger 22 is overcome so that the spring 26 is compressed inside the lock body 14. This threading and simultaneous compressing continue until the second roll pin 24 abuts against the rear end 14E of the threaded rear portion 14A of the lock body 14. Although it is not necessary to thread the rear portion 22C of the plunger 22 completely into the receiver 16, the greater the number of turns of the key 12, the tighter the seal is made between the door D and the framework F. Also, the gasoline pump will be made more secure.

The reliability of the lock assembly 10 of the present invention was tested under a variety of adverse conditions. First, a so-called "freeze" test was conducted by submerging the lock body 14 and the plunger 22 in water and then freezing them at 16° F. for 16 hours. As a result, ice formed all over the surfaces of the lock body 14, including in the hole 22H in the plunger 22. However, the warmth of the key 12 immediately melted the ice formed in the hole 22H as soon as the hollowed end 12E entered therein. Thus, the key 12 was able to turn the plunger 22 freely.

Second, a so-called "noise" test was conducted by listening carefully for any sounds made during the operation of the lock assembly 10. When the plunger 22 is being set in the open position shown in FIGS. 6A and 6B, a rubbing sound was heard between the second roll pin 24 and the rear end 14E of the lock body 14. When the plunger 22 is being set in the closed or locked position shown in FIG. 6C, a slight rubbing sound was heard. As seen in FIG. 8, when the hollowed end 12E of the key 12 entered the hole 22H in the plunger 22, the noise was made. However, in both cases when noise was generated, the hardness of the contacting elements was sufficient to reduce wear sufficiently and allow for long life.

Third, a so-called "running" test was conducted for seven hours with the plunger 22 in the closed or locked position seen in FIG. 6C. By attaching the key 12 to an automatic turning device, the plunger 22 was subjected to 100 revolutions per minute. Since it takes seven revolutions to either open or close the plunger 22, i.e. screw the threaded rear portion 22C in and out of the receiver 16, 14 turns are needed to complete one cycle of opening and closing the plunger 22 in the receiver 16. During the seven hours of testing, 42,000 revolutions of the key 12 in the plunger 22 were made, i.e. 3,000 cycles of opening and closing the plunger 22 in the receiver 16. Assuming that the plunger 22 will be opened and closed once each day for 365 days a year, the 3,000 cycles equates to 8.22 years of average use by a gasoline pump operator. Close inspection of the lock assembly 10 revealed that there was some minor wear in the outer cylindrical surfaces of the plunger 22, but the lock assembly 10 still worked on the 3,001st cycle and subsequent cycles performed manually. The reason for the wear is believed to be due to the rigidity with which the plunger 22 is held in the lock body 14 during the testing procedure. In actual operation, it is believed that less wear will occur because the plunger 22 "floats" to some extent within the coiled spring 26 which provides a slight clearance between the plunger 22 and the lock body 14.

Although the lock assembly 10 is discussed with reference to a gasoline pump, it may be used with other storage systems requiring security of the contents therein. Such systems may be quite diverse, ranging from vending machines to burial caskets.

Therefore, the foregoing preferred embodiment is considered illustrative only. Numerous other modifications will readily occur to those persons skilled in the lock manufacturing art after reading the foregoing specification. Consequently, the disclosed invention is not limited by the exact construction and operation shown and described above, but rather is defined by the claims below.

What I claim as my invention is as follows:

1. A lock assembly, comprising:
   a. a lock body having a hole longitudinally therethrough;
   b. a plunger arranged longitudinally in the hole through the lock body, said plunger having a head portion and a rear portion;
   c. a single spring means, coiled around the plunger and arranged longitudinally in the hole inside the lock body, for pushing the head portion of the plunger so that the plunger is pulled back into the lock body to an open position;
   d. key means, engagable with the head portion of the plunger, for turning the plunger to a closed position; and
   e. plate means, engagable with the rear portion of the plunger, for receiving the rear portion of the plunger in the closed position.

2. The lock assembly, according to claim 1, wherein:
   said head portion of the plunger has a geometrically shaped hole therein; and
   said key means has a hollowed end matching the geometrically shaped hole in the head portion of the plunger.

3. The lock assembly according to claim 2, further comprising:
   f. roll pin means, seated in the geometrically shaped hole in the head portion of the plunger, for guiding the hollowed end of the key means into the geometrically shaped hole in the head portion of the plunger.

4. The lock assembly, according to claim 1, wherein:
   said plunger further has a middle body portion with a hole crossways therethrough.

5. The lock assembly, according to claim 4, further comprising:
   f. roll pin means, inserted in the crossways hole through the middle body portion of the plunger, for retaining the plunger in the open position.

6. The lock assembly, according to claim 3, wherein:
   said roll pin means is hollow and springlike in order to allow the roll pin means to be squeezed into the geometrically shaped hole in the head portion of the plunger and to be frictionally retained therein.

7. The lock assembly, according to claim 5, wherein:
   said roll pin means is hollow and springlike in order to allow the roll pin means to be squeezed into the crossways hole through the middle body portion of the plunger and to be frictionally retained therein.

8. A lock assembly, comprising:
   a. a lock body having a hole longitudinally therethrough;
   b. a plunger arranged longitudinally in the hole through the lock body, said plunger having a head portion and a rear portion;
   c. a single spring means, coiled around the plunger and arranged longitudinally in the hole inside the lock body, for returning the plunger to an open position;
   d. key means, engagable with the head portion of the plunger, for turning the plunger to a closed position;
   e. plate means, engagable with the rear portion of the plunger, for receiving the rear portion of the plunger in the closed position;
   said head portion of the plunger having a geometrically shaped hole therein;
   said key means having a hollowed end matching the geometrically shaped hole in the head portion of the plunger;
   f. roll pin means, seated in the geometrically shaped hole in the head portion of the plunger, for guiding the hollowed end of the key means into the geometrically shaped hole in the head portion of the plunger;
   said roll pin means being hollow and springlike in order to allow the roll pin means to be squeezed into the geometrically shaped hole in the head portion of the plunger and to be frictionally retained therein; and
   said roll pin means having a slit means, cut longitudinally therethrough, for aiding in allowing the roll pin means to be squeezed and frictionally retained in the hole in the head portion of the plunger.

9. The lock assembly, according to claim 8, wherein:
   said geometrically shaped hole in the head portion of the plunger and the hollowed end of the key means both have hexagonal cross-sections.

10. The lock assembly, according to claim 8, wherein:
    said lock body has an internal shoulder formed inside the hole longitudinally therethrough; and
    said single spring means is confined to longitudinal movement between the head portion of the plunger and the internal shoulder formed inside the hole in the lock body.

11. The lock assembly, according to claim 8, wherein:
    said receiving plate means includes a leg means, flaring outwardly therefrom, for locating the receiving plate means on a frame to which the receiving plate means is to be mounted.

12. The lock assembly, according to claim 8, further comprising:
    g. threaded means, attached to the receiving means, for providing extra threading into which the rear portion of the plunger may be received in the closed position.

13. The lock assembly according to claim 8, further comprising:
    g. washer means, secured around the lock body, for locking the lock body in a bore made through a door into which the lock body is to be mounted; and
    h. threaded means, secured around the lock body and positioned adjacent to the washer means, for jamming the lock body in the bore made through the door into which the lock body is to be mounted.

14. A lock assembly, comprising:
    a. a lock body having a hole longitudinally therethrough;
    b. a plunger arranged longitudinally in the hole through the lock body, said plunger having a head portion and a rear portion;
    c. a single spring means, coiled around the plunger and arranged longitudinally in the hole inside the lock body, for returning the plunger to an open position;
    d. key means, engagable with the head portion of the plunger, for turning the plunger to a closed position;
    e. plate means, engagable with the rear portion of the plunger, for receiving the rear portion of the plunger in the closed position;

said plunger further has a middle body portion with a hole crossways therethrough;
f. roll pin means, inserted in the crossways hole through the middle body portion of the plunger, for retaining the plunger in the open position;
said roll pin means being hollow and springlike in order to allow the roll pin means to be squeezed into the crossways hole through the middle body portion of the plunger and to be frictionally retained therein;
said roll pin means having a slit means, cut longitudinally therethrough, for aiding in allowing the roll pin means to be squeezed and frictionally retained in the crossways hole through the middle body portion of the plunger.

15. The lock assembly, according to claim 14, wherein:
said receiving plate means includes a leg means, flaring outwardly therefrom, for locating the receiving plate means on a frame to which the receiving plate means is to be mounted.

16. The lock assembly, according to claim 14, further comprising:
g. threaded means, attached to the receiving means, for providing extra threading into which the rear portion of the plunger may be received in the closed position.

17. The lock assembly, according to claim 14, further comprising:
g. washer means, secured around the lock body, for locking the lock body in a bore made through a door into which the lock body is to be mounted; and
h. threaded means, secured around the lock body and positioned adjacent to the washer means, for jamming the lock body in the bore made through the door into which the lock body is to be mounted.

* * * * *